June 7, 1966   V. M. TYLER   3,254,863
SPACE VEHICLE SECUREMENT
Filed Aug. 2, 1962   4 Sheets-Sheet 1

INVENTOR.
VERNAL M. TYLER
BY
ATTORNEY

June 7, 1966  V. M. TYLER  3,254,863
SPACE VEHICLE SECUREMENT
Filed Aug. 2, 1962  4 Sheets-Sheet 2
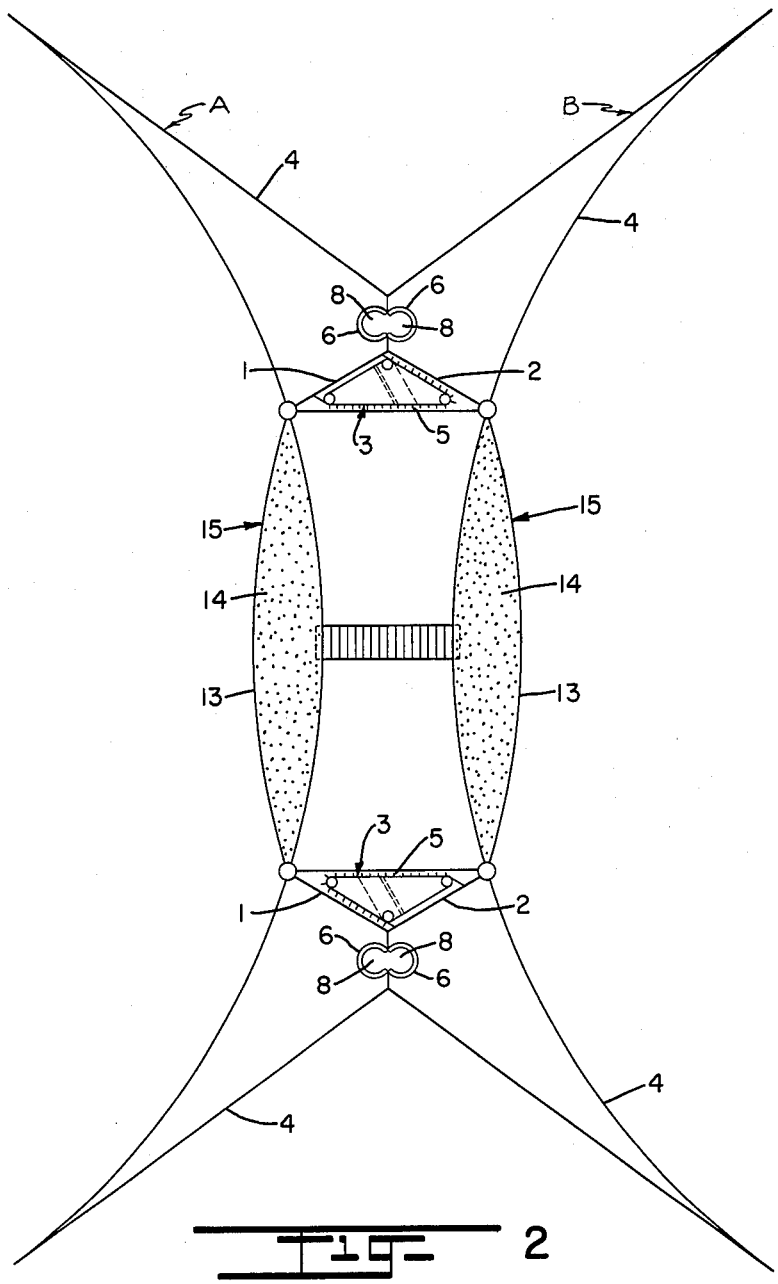
INVENTOR.
VERNAL M. TYLER
BY
ATTORNEY

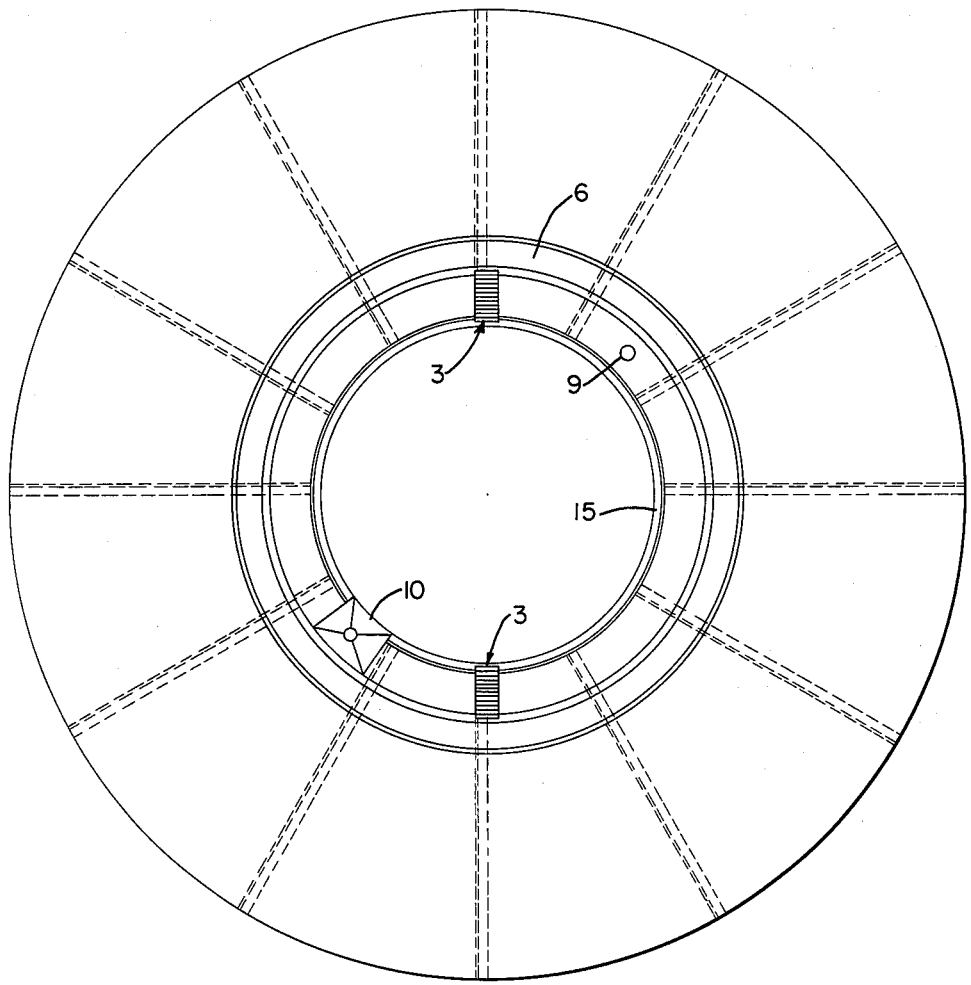

June 7, 1966　　　V. M. TYLER　　　3,254,863
SPACE VEHICLE SECUREMENT

Filed Aug. 2, 1962　　　　　　　　　4 Sheets-Sheet 4

INVENTOR.
VERNAL M. TYLER
BY
ATTORNEY

United States Patent Office 3,254,863
Patented June 7, 1966

3,254,863
SPACE VEHICLE SECUREMENT
Vernal M. Tyler, Castle Rock, Colo., assignor to Martin-Marietta Corporation, Baltimore, Md., a corporation of Maryland
Filed Aug. 2, 1962, Ser. No. 214,405
9 Claims. (Cl. 244—1)

This invention relates to space craft and in particular to securement means for releasably sealing or joining together sections of a space structure where the sections to be joined in space are made to rendezvous and are then sealed together in space.

Orbital launch operations and other activities in space involve the construction and assembly of space stations and other structures. Such structures will be assembled by orbiting sections thereof piece by piece, rendezvousing the sections and appropriately connecting the sections. This invention is concerned with the final mating operation after the rendezvousing sections have been brought within a specified alignment tolerance. The problem is especially difficult in that as final contact of the sections is made in the gravity-free space regime, no forces are present which tend to keep the sections from "bumping apart" as action and reaction take place. Another problem encountered is to provide for automatic, positive locking of the sections by automatic or remote controls. A further problem involved is to automatically seal the joint of the connected sections so that astronauts can travel from one section to the other through the sealed joint. An additional problem to be solved is to make provisions for safe and positive separation of the joined sections, when desired.

Accordingly, it is an important object of this invention to provide securement means for sections of a space structure upon rendezvous thereof in space which will insure that upon initial contact between the sections they will be brought together and will not bump apart.

Another object of this invention is to provide such a securement means which will automatically seal and join sections of a space structure such as a space station in space upon alignment of the sections.

A further object of this invention is to provide such a securement means which will provide for a safe passage of space personnel from one section of a space structure to another through a sealed joint in a pressurized atmosphere.

An additional object of this invention is to provide such a securement means which is capable of being automatically separated for reuse.

Additional objects will become apparent from the following description which is given primarily for purposes of illustration and not limitation.

Stated in general terms, the objects of this invention are attained by providing a securement device on each section of a space structure or craft comprising a tubular member, such as a conical tube member, attached at its narrow end to the space craft section and opened at its wide end. The narrow end preferably is provided with an access hatch and the wide end, which is fitted with a recessed, inflatable toroidal lip, extends from the space craft section. The wide end of the conical tube also is provided with one or more power driven endless belt means having a portion thereof extending beyond the mouth of the conical tube. The extending portion of the belt means preferably is at the same angle as the walls of the conical tube on a section to be joined.

In operation, upon proper alignment of the wide ends of two conical tubes extending respectively from two space craft sections to be joined in space, the extending endless belt means of one conical tube contacts the inner conical surface of the other aligned conical tube and pulls the two tubes into mating relationship. At this stage the openings of the toroid retaining recesses are matched and the joining and sealing together of the two sections of space craft is accomplished by inflating one of the toroidal members so that it expands into the retaining recess of the other member. The screw of the space craft now is permitted to pass safely through the securement device from one space craft section to the other and can secure any further mechanical locking devices desired for added safety. Positive separation of the joined secions of space craft is readily accomplshed by deflating the originally inflated toroid of the mating conical tube to force the former toroid out of the recess of the latter toroid.

A more detailed description of a particular embodiment of the invention is given below with reference to the accompanying drawings, wherein:

FIG. 1 is a partial schematic side elevational view in section showing the orientation of endless belt means when two space craft sections are aligned for engagement of their respective conical tube securement devices;

FIGURE 1a is another partial schematic elevational view in section similar to the view shown in FIGURE 1 but taken along a plane angularly displaced approximately 30° about the longitudinal axis of the two space craft sections shown in FIGURE 1, showing the orientation of the probe and drogue elements when two space craft sections are aligned for engagement of their respective conical tube securement devices;

FIG. 2 is an elevational cross sectional view of two space craft sections shown in joined relationship;

FIG. 3 is a partial schematic end view showing a plan of a securement device including a module structure;

Figure 1:
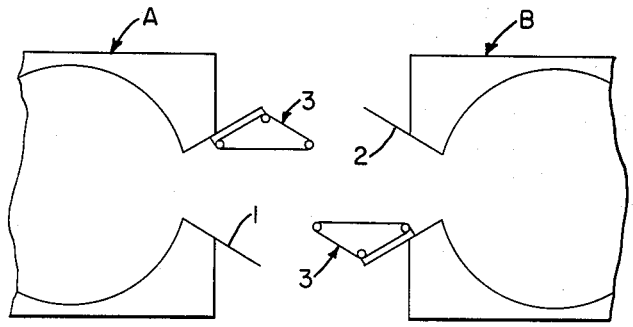
Figure 4:
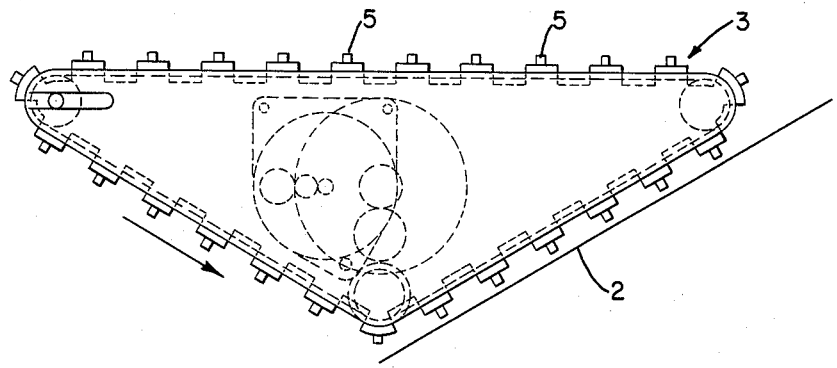
FIG. 4 is a side elevational view showing details of a motor-driven endless belt assembly.

After the rendezvous of two space craft sections A and B has been successfully accomplished in space, the respective conical tubes 1 and 2 are aligned for mating relationship. The included angle of conical tubes 1 and 2 is conveniently chosen to be 60° for practical use as crew crawl tubes. Each crawl tube 1 and 2 is provided with two or three triangular, motor driven endless belt assemblies 3. The endless belt assemblies 3 are properly interdigitated upon rendezvous of space craft sections A and B, in the manner illustrated. The endless belts of assemblies 3 are power driven in a direction which pulls the module structures 4, of conical tubes 1 and 2, together by friction, as elastomeric lugs 5, attached to the outsides of the endless belts, contact the mating conical tubes, or crawl tubes, 1 and 2. An engaging and mating action is thus performed which accurately positions the space craft sections A and B in tandem.

Figure 6:
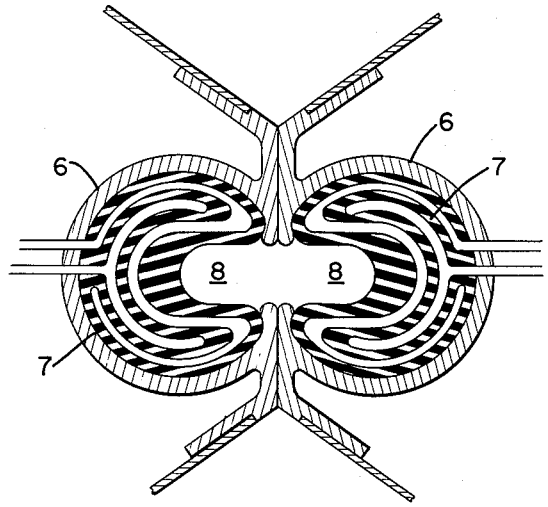
FIG. 6 is a partial, schematic, enlarged view in sectional side elevational showing details of inflatable toroidal tubes ready for mating.

Concentric with the mated conical tubes 1 and 2 and at a slightly larger diameter are a pair of matching annular rings 6 which form mating annular recesses 8 in module structures 4. Inflatable toroidal lip means comprising toroidal tubes 7, of suitable material to create the joining or tie of sections hereinafter discussed, are housed in recesses 8 formed by rings 6. It can be seen in FIG. 6 that the ends of each ring 6 form a throat which is narrower than the maximum diameter of the toroidal cross section of the respective recesses 8. Toroidal tubes 7 each are adapted to expand, respectively, from their own housing recess 8 through the respective throats and into the mating recess 8 of the engaged space craft section A or B. By virtue of this adaptation, each end of each space craft section can be joined to either end of any other space craft section. Upon making the joint or seal, the toroidal tube 7 chosen for pressurization, upon being pressurized, has a portion thereof expanded out of its housing recess 8 thereby forming a toroidal lip (not shown) which expands into the mating recess; compresses the toroidal tube housed in the mating recess and fills the cavity of the recess to produce a perfect seal and a temporary locking joint between the two crawl tubes 1 and 2. An astronaut can enter the crawl tube 1 or 2, attach a positive mechanical tie (not shown) between space craft sections A and B and, if desired, remove the endless belt assemblies 3 to apply a permanent tape-type air seal, for example, at the internal faying surfaces of the crawl tubes 1 and 2.

In situations where control system tolerances are not adequate for sufficiently precise radial alignment, two cone-type probes 9 and drogues 10 are interdigitated with respect to the endless belt assemblies 3 and are attached to the module structures 4 mounted around the conical tubes 1 and 2, as shown. The threaded tip of each probe 9 extends through a tube in the center of an aligned drogue 10 during mating. Special nuts (not shown) are torqued to the probe 9 to acomplish positive mechanical attachment of one spaced craft section A to the other section B.

When it is desired to separate two joined space craft sections A and B, the above-described operation is reversed. That is, any auxiliary or permanent tape-type ties or connections are removed. The endless belt assemblies 3 are mounted in the conical crawl tubes 1 and 2. Any probe and drogue nuts are untorqued and the crew retires to the desired space craft section A or B. The inflated toroidal tube 7 is depressurized and then both of the matching toroidal tubes are simultaneously inflated. This results in the production of a separating force in each toroidal tube 7 which pushes the sections A and B apart. The endless belt assemblies 3 generally are not required for the separation operation, but they are in position for the next rendezvous.

Among the advantages of this system are that it readily lends itself to automatic, remote control. It is capable of lightweight construction. The endless belt assembly guarantees final seating or mating of the conical tubes. No threads to cross or strip are involved in the securement means and positive, accurate separations are achieved between joined sections.

The matching annular rings 6 can be made in the form of rolled aluminum extrusions, as shown at 11. The inflatable toroidal tubes 7 can be double-chambered, as shown, or alternatively, they can be single-chambered as shown at 12. The double chambered arrangement is preferred as such introduces an operational safety factor through redundancy. Crew access hatches 15 can be mounted on the inner ends of conical crawl tubes 1 and 2, as shown. Hatches 15 can be made of two spaced thin dished sheets 13 having their intermediate spacing filled with rigid polyurethane foam 14 for strong, lightweight construction.

Figures 1A, 5:
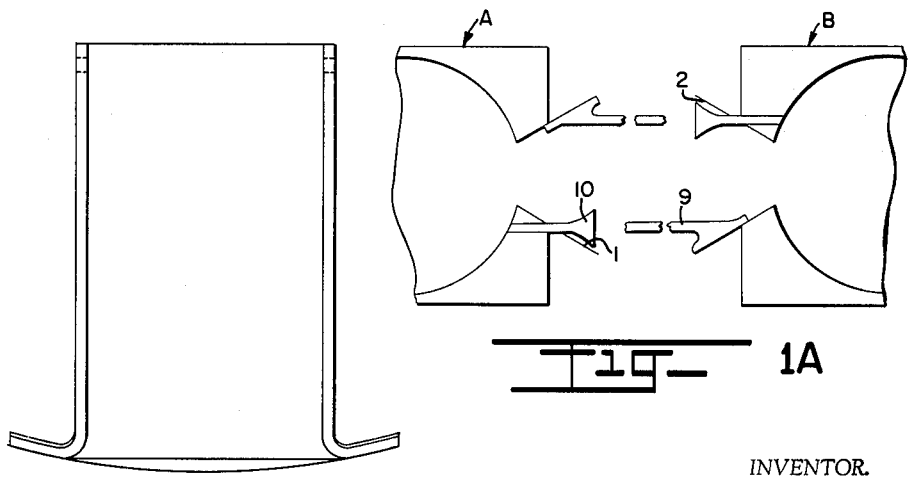
FIG. 5 is a partial plan view showing a mounting bracket for the endless belt assembly of FIG. 4.
Figure 7:
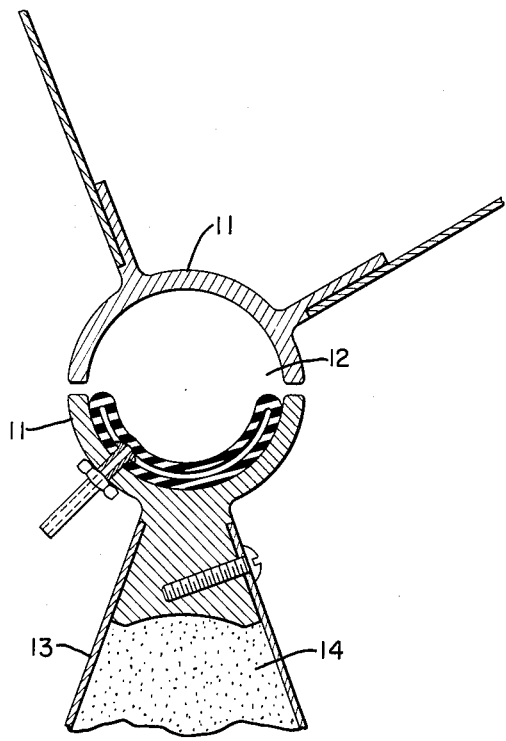
FIG. 7 is a similar view showing details of an access hatch sealing construction.

Details of a suitable motor driven endless belt assembly are shown by way of example, and mounting brackets therefor may take suitable form such as exemplified in FIGURE 5, any such brackets being adapted for removal and servicing in a pressurized zone. It will be understood that variations from the details of the endless belt and bracket will occur to persons skilled in the art. Also, the conical crawl tubes 1 and 2 can be replaced by tubes of any desired configuration such as cylindrical, hexagonal in cross-section, etc. Many modifications are possible in the shapes and locations of the mating members and in the auxiliary guide and locking means within the spirit of the invention. It is, therefore, to be understood that within the scope of the appended claims the invention can be practiced otherwise than as specifically described.

What is claimed is:

1. A securement device for joining two sections of a space craft comprising a space craft section, a tubular member mounted on the space craft section having one end thereof extending from the space craft section and an endless belt means mounted on the extending end of the tubular member having a portion of the belt means extending beyond the end of the tubular member and adapted for engaging and attracting the extending end of a similar aligned tubular member, mounted on a second space craft section toward the first-mentioned space craft section, upon rendezvous in space of the two space craft sections.

2. A securement device for joining two sections of a space craft comprising a space craft section, a tubular member mounted on the space craft section having one end thereof extending from the space craft section, a recessed inflatable toroidal lip means mounted around the extending end of the tubular member and an endless belt means mounted on the extending end of the tubular member having a portion of the belt means extending beyond the end of the tubular member and adapted for engaging and attracting the extending end of a similar aligned tubular member mounted on a second space craft section toward the first-mentioned space craft section, upon rendezvous in space of the two space craft sections, said recessed inflatable toroidal lip means being adapted for inflation and expansion into a recess of a similar recessed inflatable toroidal lip means similarly mounted on said second space craft section for establishing a sealed joint between the two space craft sections.

3. A securement device for joining two sections of a space craft comprising a space craft section, a tubular member mounted on the space craft section having one end thereof extending longitudinally from the space craft section provided with a recess facing longitudinally from said tubular member and extending concentrically therearound, said recess having a throat which is narrower than the maximum diameter of the toroidal cross section of said recess, a recessed inflatable toroidal lip means in said recess adapted for inflation and expansion into a similar recess, having a narrow throat and a similar recessed inflatable toroidal lip means therein similarly mounted on a second space craft section upon rendezvous of said two space craft sections for establishing a sealed, locked joint between said two space craft sections.

4. A securement device for joining two sections of a space craft comprising a space craft section, a conical tubular member mounted on the space craft section having its narrow end extending into the space craft section and having its wide end extending from the space craft section and an endless belt means mounted inside the wide end of the tubular member, said belt means having a portion thereof extending beyond the wide end of the tubular member and adapted for engaging the inside surface of the extending end of a similar aligned tubular member mounted on a second space craft section and adapted for pulling the tubular member of the second space craft section into mating relationship with that of the first-mentioned space craft section.

5. A securement device for joining two sections of a space craft comprising a space craft section, a conical tubular member mounted on the space craft section having its narrow end extending into the space craft section and having its wide end extending longitudinal from the space craft section provided with a recess facing longitudinally from said tubular member and extending concentrically therearound, said recess having a throat which is narrower than the maximum diameter of the toroidal cross section of said recess, a recessed inflatable toroidal lip means in said recess adapted for inflation and expansion into a similar recess having a narrow throat and a similar recessed inflatable and deflatable toroidal lip means therein, similarly mounted on a second space craft section upon rendezvous of said two space craft sections for establishing a releasable sealed, locked joint between said two space craft sections.

6. A securement device according to claim 5, wherein the conical tubular member is provided at its narrow end with a personnel access hatch means.

7. A securement device according to claim 5 wherein probe means and drogue means are mounted on the space craft section around the wide end of the tubular member for cooperation with similar respective means similarly mounted on said second space craft section for effecting precise radial alignment of the two space craft sections upon rendezvous and for establishment of a joint between the two sections.

8. A securement device according to claim 3, wherein said recess is formed by a ring attached to the outer end of said tubular member and having a slot in the longitudinally facing side thereof forming said throat.

9. A securement device for securing two elements together comprising a member adapted to be connected to one of said elements and having an outwardly facing recess therein, said recess having a throat which is narrower than the maximum diameter of said recess; a recessed inflatable lip means in said recess adapted for inflation and expansion into a similar recess having a narrow throat and a similar recessed inflatable lip means therein on the other of said elements for establishing a releasably sealed locked joint between said elements.

References Cited by the Examiner

UNITED STATES PATENTS

| | | | |
|---|---|---|---|
| 2,104,144 | 1/1938 | Zand | 244—129 |
| 3,001,739 | 9/1961 | Faget et al. | 244—1 |
| 3,017,137 | 1/1962 | Helmke et al. | 244—120 |

FOREIGN PATENTS 95,764   3/1960   Norway.

OTHER REFERENCES

Advances in Astronautical Sciences, vol. 4, 1959, pp. 155–157.

FERGUS S. MIDDLETON, *Primary Examiner.*